United States Patent
Hart et al.

(10) Patent No.: US 6,797,385 B2
(45) Date of Patent: Sep. 28, 2004

(54) POWDER COATING OF COOH ACRYLIC RESIN, POLYEPOXIDE AND LOW T CATALYST

(75) Inventors: Stephen C. Hart, Hudson, WI (US); Jeffrey G. Schmierer, Oakdale, MN (US); Brian W. Carlson, Woodbury, MN (US); Stephen C. Larson, St. Paul, MN (US)

(73) Assignee: H. B. Fuller Licensing & Financing Inc., St. Paul, MN (US)

( * ) Notice: Subject to any disclaimer, the term of this patent is extended or adjusted under 35 U.S.C. 154(b) by 58 days.

(21) Appl. No.: 10/241,600

(22) Filed: Sep. 11, 2002

(65) Prior Publication Data

US 2003/0069355 A1 Apr. 10, 2003

Related U.S. Application Data

(63) Continuation of application No. 09/579,621, filed on May 26, 2000, now Pat. No. 6,479,585.

(51) Int. Cl.$^7$ .................. B32B 21/08; B08B 27/10; C08L 33/02; C08L 33/14; C08L 63/00
(52) U.S. Cl. ............... 428/413; 428/418; 428/463; 428/511; 525/108; 525/111; 525/119; 525/207; 525/208
(58) Field of Search .............................. 428/413, 418, 428/511, 463; 525/108, 111, 119, 207, 208

(56) References Cited

U.S. PATENT DOCUMENTS

| | | | | |
|---|---|---|---|---|
| 4,027,066 A | * | 5/1977 | Victorius | 428/334 |
| 4,921,913 A | * | 5/1990 | Pettit, Jr. | 525/119 |
| 4,990,587 A | | 2/1991 | Shaw et al. | 528/113 |
| 5,189,118 A | * | 2/1993 | Waddill et al. | 525/504 |
| 5,202,382 A | * | 4/1993 | Pettit, Jr. | 525/108 |
| 5,244,944 A | | 9/1993 | Bott et al. | 523/461 |
| 5,250,634 A | * | 10/1993 | Toyoda et al. | 525/438 |
| 5,547,757 A | * | 8/1996 | Swarup et al. | 428/413 |
| 5,686,185 A | * | 11/1997 | Correll et al. | 428/418 |
| 5,721,052 A | * | 2/1998 | Muthiah et al. | 428/413 |
| 5,744,522 A | * | 4/1998 | Prucnal et al. | 523/442 |
| 5,907,020 A | * | 5/1999 | Correll et al. | 525/526 |
| 6,022,927 A | * | 2/2000 | Decker et al. | 525/111 |
| 6,245,839 B1 | * | 6/2001 | Jolley et al. | 524/86 |
| 6,296,939 B1 | * | 10/2001 | Kunze et al. | 428/413 |

FOREIGN PATENT DOCUMENTS

| | | | |
|---|---|---|---|
| DE | 35 45 061 | 6/1987 | |
| DE | 196 22 921 | 12/1997 | |
| EP | 0 600 546 | 6/1994 | |
| FR | 2263265 A * | 11/1975 | ........... C07B/00/00 |
| GB | 1467052 A * | 3/1977 | ........... C07B/00/00 |
| GB | 2312897 A * | 11/1997 | ......... C09D/163/00 |
| JP | 55102672 A * | 8/1980 | .............. C09J/7/04 |

* cited by examiner

*Primary Examiner*—Robert Sellers
(74) *Attorney, Agent, or Firm*—Bin Su

(57) ABSTRACT

A powder coating composition for heat-sensitive substrates curable at a temperature of about 300° F. or below for about 30 minutes or less comprises a) from about 10–90% by weight, relative to a) plus b), of carboxylic acid-functional acrylic resin(s); b) from about 10–90% by weight, relative to a) plus b), of polyepoxy resin(s); c) a catalyst in an amount sufficient to cure the composition at a temperature of about 300° F. or below for about 30 minutes or less; and d) optionally, a flexiblizing agent.

26 Claims, No Drawings

POWDER COATING OF COOH ACRYLIC RESIN, POLYEPOXIDE AND LOW T CATALYST

This is a continuation of application Ser. No. 09/579,621, filed on May 26, 2000, U.S. Pat. No. 6,479,585.

FIELD OF THE INVENTION

The invention relates to new thermosetting powder coating compositions. Specifically, the invention relates to new acid functional acrylic/polyepoxy powder coating compositions. More specifically, the invention relates to new acid functional acrylic /polyepoxy powder coating compositions for coatings on heat sensitive substrates such as wood substrates to produce thereon by a low temperature cure a finish with high hardness and/or controllable gloss.

DESCRIPTION OF THE RELEVANT ART

It is well known that powder coating is a low polluting, cost effective method to provide high quality finishes on substrates such as metal substrates and therefore, is used more and more to replace liquid finishing in various industries. Traditionally, powder coatings are used to coat metal objects, e.g., in the automotive and appliance industries. Metal objects are very good electric conductors and can be heated to high temperature. Thus, conventional powder coating compositions are easily applied onto metal substrates by any of the electrostatic deposition techniques known in the art to form a fine finish. The coated metal substrates are normally cured at elevated temperatures ranging from 300° F. to 450° F. Since high temperatures do not significantly distort metal substrates, heat sensitivity of the work piece is generally not a concern. There has been well developed in the art powder coating compositions that are cured at high temperatures to provide high performance coatings on metal substrates.

More recently, efforts have been made to apply powder coatings to non-metal substrates, known as heat sensitive substrates, e.g., plastics, pre-assembled products and wood products. Examples of wood products include household furniture, office furniture, and construction components such as doors, siding, widow frames, shelving and molding. While some plastic articles may be manufactured with the appropriate color and may not need coatings, some other plastic products and especially many wood products must be coated for decorative or protective purpose or both. Although some success has been achieved in coating non-metal substrates, problems remain, especially with coatings on wood substrates due to the distinct natural difference between metal substrates and wood substrates.

Naturally, wood substrates contain more moisture and volatile compounds. The moisture and the volatile compounds are readily released as gasses during the high temperature cure process associated with traditional powder coatings on metal substrates. This outgassing disrupts the surface of the coating material, resulting in pinholes and other defects in the coating surface, thereby damaging the appearance of the coating. Therefore, conventional high cure temperatures are not usable for coating powders on wood substrates. Presently, one approach to avoid pinhole and defects in the coating surface is to provide a textured coating having, e.g., a grainy texture, or a coating with an orange peel appearance that mask the underlying non-uniformity of the substrate. Another approach to eliminate outgassing is to develop a low temperature cure coating powder system to lower the cure temperature and/or shorten the cure time. However, the lower the cure temperature and/or the shorter the cure time are, the more difficult it is to achieve high performance. Likewise, the lower the cure temperature and/or the shorter the cure time are, the more difficult it is to control gloss, especially to achieve aesthetically desired low gloss. Further, the lower the cure temperature and/or the shorter the cure time are, the more difficult it is to process the powder coatings as traditional process temperatures are in the same range as the targeted cure temperatures. Higher performance coatings as defined by toughness and durability tests like hardness, scratch, mar, chemical resistance and impact can be challenging with traditional coating powders cured at high temperatures. Again the challenge becomes greater as the cure temperature is lowered or the cure time is shortened.

Various powder coating compositions used on either or both metal and wood substrates in the relevant art are described in the patent literature.

U.S. Pat. No. 6,022,927 discloses an acrylic powder coating composition used on metal and wood substrates. The composition contains basically an acid functional acrylic resin; an adduct of an acid functional polyester and a polyepoxy (e.g., trigylcidylisocyanurate (TGIC)); and a curing agent that is also TGIC to provide orange peel textured surfaces on both metal and wood substrates. It is specifically taught that a coating powder prepared by simply mixing the carboxyl functional acrylic resin, the curing agent (TGIC) and the polyester does not provide a coating with desired physical properties. Only if the curing agent (TGIC) and the polyester are adducted prior to forming the coating powder, can the coating with desired properties be produced. The cure temperature may be reduced to 300° F. or below upon addition of a cure catalyst. 60° gloss tested on metal substrate is higher than 75. Pencil Hardness of the coating surface, tested on metal panel, is from F to 2H.

U.S. Pat. No. 5,907,020 discloses a thermosetting powder coating system, based on a mixture of an extrudate of a catalyzed self-curing epoxy resin and a low temperature curing agent. The epoxy resin is first extruded with a catalyst, then the extrudate is mixed with a low temperature curing agent to form the coating powders. The low temperature curing agent is an epoxy adduct of an imidazole catalyst or an epoxy adduct of an aliphatic polyamine, to provide low gloss coatings on metal and wood substrates. The cure temperature may be 290° F. or below. 60° gloss tested on steel panel varies from 15 to 80.

U.S. Pat. No. 5,721,052 discloses a thermosetting powder coating composition based on Bisphenyl A type of epoxies, an imidazole catalyst and a texturing agent, for forming a grainy textured finish on both metal and wood substrates. The cure temperature may be about 350° F. or below. 60° gloss tested on metal panel is below 6. Pencil Hardness, tested on metal panels, is from H to 2H.

All the powder coating compositions disclosed, however, do not provide coatings on heat sensitive substrates, especially wood substrates with the advantageous combination of a low cure temperature, controllable gloss, and very high hardness.

Therefore, there is a need for a new powder coating composition that can be coated by means of traditional powder coating application methods on heat sensitive substrates, especially wood substrates and cured at low temperature to produce a finish with controllable gloss and very high performance such as hardness without damaging the substrates.

SUMMARY OF THE INVENTION

The invention provides a new powder coating composition in particulate form consisting essentially of a mixture of:

a). about 10% to 90% by weight, relative to (a) plus (b), of carboxylic acid functional acrylic resin(s);

b). about 10% to 90% by weight, relative to (a) plus (b), of polyepoxy resin(s);

c). a catalyst in an amount sufficient to cure the composition at a temperature about 300° F. or below for about 30 minutes or less; and d). optionally, a flexibilizing agent.

In another aspect, the invention provides a new powder coating composition comprising:

a). about 10% to 90% by weight, relative to (a) plus (b), of carboxylic acid functional acrylic resin(s);

b). about 10% to 90% by weight, relative to (a) plus (b), of polyepoxy resin(s); and c). a catalyst in an amount sufficient to cure the composition at a temperature about 300° F. or below for about 30 minutes or less, wherein the composition provides a finish having a pencil hardness of at least 3H.

In yet another aspect, the invention provides a new powder coating composition comprising:

a). about 10% to 90% by weight, relative to (a) plus (b), of carboxylic acid functional acrylic resin(s);

b). about 10% to 90% by weight, relative to (a) plus (b), of polyepoxy resin(s);

c). a first catalyst which functions primarily as an epoxy homopolymerization catalyst; and d). a second catalyst which functions primarily as an epoxy/carboxylic acid reaction catalyst.

The new powder coating-compositions of the invention are readily applied, e.g., by means of electrostatic deposition or fluidized bed methods, to various substrates, especially heat sensitive substrates, e.g., plastic or wood substrates to provide finishes having controllable gloss and high performance including very high hardness.

The coatings of the invention may be cured at a temperature of about 300° F. or below for about 30 minutes or less to form coating films on substrates, especially wood substrates, thereby, diminishing outgassing from the substrates without damaging the substrates. The cured coatings of the invention may produce 60° gloss of from about 2 to 95 and pencil hardness of from about F to 9H.

Particularly, the new powder coating compositions of the invention are readily coated by electrostatic spray and cured on heat sensitive substrates, especially wood substrates at a temperature of about 280° F. or below for about 20 minutes or less, to produce a finish having an aesthetically acceptable 60° low gloss of from about 5 to about 60, preferably, of from about 10 to about 40, and pencil hardness of from H to 9H, preferably, from 3H to 9H.

In yet another aspect, the invention provides an article comprising a heat sensitive substrate coated on at least one surface of the substrate with any of the aforesaid new powder coating compositions of the invention and cured at a temperature of about 300° F. or below for about 30 minutes or less to produce a decorative and/or protective finish with controllable 60° gloss of from about 2 to 95 and controllable performance regarding chemical resistance, hardness, etc., depending on application.

In particular, the article of the invention comprises a wood substrate coated on at least one of the surfaces of the substrate with any of the aforesaid new powder coating compositions of the invention and cured at a temperature of about 300° F. or below for about 30 minutes or less to produce a finish having 60° gloss of from about 5 to 60, preferably from about 10 to about 40, and pencil hardness of from F to 9H, preferably, from H to 9H, and more preferably from 3H to 9H.

DETAILED DESCRIPTION OF THE INVENTION

For the purpose of the invention, the term "wood" is defined as including natural wood and engineered wood such as plywood, particleboard, oriented strand board, hardboard, medium density fiberboard, and the like. The particleboard may be standard or treated to enhance its electrical conductivity. Wood, pre-coated with a conductive liquid coating composition and cured, may also be used as a substrate for the purpose of the invention. Wood having moisture content of from about 3 to about 10% by weight is preferred.

For the purpose of the invention, "reduced or low cure temperature" means a cure temperature of about 300° F. or below to achieve desired performance, as compared to the traditional high cure temperature of higher than 300° F. to about 450° F.

The thermosetting powder coating compositions of the invention include carboxylic acid functional acrylic resin(s). The carboxylic acid functional acrylic resins useful in the invention are formed from typical acrylic monomers known in the art, such as acrylic acid or methacrylic acid; acrylic acid derivatives such as methyl acrylate, ethyl acrylate, propyl acrylate, isopropyl acrylate, butyl acrylate, isobutyl acrylate, 2-ethylhexyl acrylate, isooctylacrylate, dodecyl acrylate, stearyl acrylate, cyclohexyl acrylate, benzyl acrylate, hydroxyethyl acrylate, hydroxypropyl acrylate, hydroxybutyl acrylate, 1,4-butanediol monoacrylate and dimethylaminoethyl acrylate; methacrylic acid derivatives such as methyl methacrylate, ethyl methacrylate, propyl methacrylate, isopropyl methacrylate, butyl methacrylate, isobutyl methacrylate, isooctylmethacrylate, 2-ethylhexyl methacrylate, dodecyl methacrylate, steary methacrylate, cyclohexyl methacrylate, benzyl methacrylate, phenyl methacrylate, hydroxyethyl methacrylate, hydroxylpropyl methacrylate, hydroxybutyl methacrylate, 1,4-butanediol monomethacrylate and dimethylaminoethyl methacrylate; etc. Such monomers may be used each separately or in the combination of two or more. Other monomers such as styrene, substituted styrene, or vinyl toluene, etc. may also be incorporated. Commercially available examples of the carboxylic acid functional acrylic resins include, e.g., those under the trademark designation SCX™ acrylic resins by S. C. Johnson.

According to the invention, carboxylic acid functional acrylic resins may be used separately or in combination of two or more in the powder coating composition of the invention. The composition may comprise about 10% to about 90% by weight, preferably, about 10% to about 60% by weight, and most preferably, about 10% to about 40% by weight of the carboxylic acid functional acrylic resin(s), based on the total weight of resins used in the powder coating composition of the invention.

The powder coating compositions of the invention also include polyepoxy resin(s). A wide variety of polyepoxy resins may be used in the powder coating compositions of the invention. Typically, the polyepoxy resins should have at least two epoxy groups per molecule, including saturated or unsaturated, aliphatic, cycloaliphatic or heterocyclic compounds and may be substituted with substituents such as halogen atoms, alkyl groups, ether groups and the like. Suitable polyepoxy resins include glycidyl ethers of aromatic and aliphatic polyols, cycloaliphatic polyepoxides, epoxy-functional acrylic resins, heterocyclic polyepoxides, glycidyl esters of aromatic and aliphatic polycarboxylic acids, glycidyl polyamines and ether amines, and mixtures thereof. For example, the polyepoxy resins may be solid epoxy resins based on bisphenol A (2,2'-bis(p-hydroxyphenyl)propane) and epichlorohydrin, i.e., the diglycidyl ether of bisphenol A and higher addition products thereof. The polyepoxy resins may include solid epoxy resins based on bisphenol F (4,4'-dihydroxydiphenylmethane), saturated bisphenol A (2,2'bis (4-hydroxycyclohexyl)propane) and epichlorohydrin and higher addition products. Also included are epoxy resins made by the reaction of epichlorohydrin with a novolac resin. A novolac resin is a condensate of a phenol compound with formaldehyde in the presence of acid catalysts. The phenol compound can be phenol itself, or compounds such as cresols, xylenols, resorcinol, naphthols, and the like. The epoxy resins are available from a wide variety of commercial sources under the trademark designation such as EPON™ or Epikote™ from Shell (Houston, Tex.), Araldite™ from Ciba Geigy Corp. (Hawthorne, N.Y.) and DER from Dow Chemical Company (Midland, Mich.). Commercially available epoxy resins include Epikote™ 1001, Epikote™ 1002, Epikote™1004, Epikote™ 1007, and Epikote™1009 from Shell Chemical Co.; Epo-Thoto YD-012 by KUKDO Chemical Ind. Co., Ltd.; DER™ 642 and DER™ 672 from Dow Chemical Co.; Araidite™ 7220 from Ciba Geigy Co.; Araldite™ ECN 1235, Araldite™ ECN 1273, and Araldite™ ECN 1280 from Ciba Geigy Co. Other useful epoxy resins include bisphenol S epoxy resins; hydrogenated bisphenol A epoxy resins. Polyepoxy resins based on bisphenol A are preferred from among the polyglycidyl ethers of aromatic polyols. Useful heterocyclic polyepoxides include 1,3,5-tris (2,3-glycidylpropyl) 1,3,5-triazine-2,4,6-(1H,3H,5H)-trione known as triglycidyl isocyanurate (TGIC), 1,3,5-tris (2,3-glycidyl-2-methyl propyl) 1,3,5-triazine-2,4,6-(1H,3H,5H)-trione, the diglycidyl ester of terephthalic acid and the triglycidyl ester of trimellitic anhydride. Commercially available heterocyclic polyepoxides include Araldite™ PT-810 from Ciba Geigy Co and MT-239 from Nissan Chemical, and glycidyl esters include PT-910 by Ciba Geigy Co. Suitable epoxy functional acrylic resins may be produced by polymerizing epoxy functional acrylates alone or in combination with other vinyl monomers, including other acrylic esters, styrene and substituted styrenes, as specified before. Examples of epoxy functional acrylate monomers include glycidyl acrylate, glycidyl methacrylate, beta-methylglycidyl acrylate, beta-methylglycidyl methacrylate, N-glycidyl acrylic acid amide and the like, among which glycidyl acrylate and glycidyl methacrylate are preferred. Examples of commercially available epoxy functional acrylic resins include Fineclad™A-244-A by Reichold, Almatex™ PD 7690 by Anderson Co. and GMA 300™ by Estron Chemical Company.

The polyepoxy resins may be used separately or in combination of two or more in the powder coating compositions of the invention. For example, one bisphenol A type of polyepoxy resin may be used alone or in combination with other bispenol A type of polyepoxy resin or with novolac type of polyepoxy resins. Likewise, bisphenol A type of polyepoxy resins may be used in combination with triglycidyl isocyanurate and/or with epoxy functional acrylic resins.

The powder coating composition of the invention may comprise from about 10% to about 90% by weight, preferably, from about 40% to about 90% by weight, and more preferably, from about 60% to about 90% by weight of the polyepoxy resin(s), based on total weight of resins used in the powder coating composition of the invention.

The powder coating compositions of the invention may also include a catalyst that allows the powder coating to cure at a temperature of about 300° F. or below, preferably, about 280° F. or below. Examples of the useful catalysts may include imidazoles, imidazole/epoxy adducts, tertiary amines, imidazolines, imidazoline salts of mono- or di-carboxylic acids, tetraalkylammonium salts, phosphonium salts, tin catalysts e.g., stannous octoate, and mixtures thereof. Examples of imidazoles may include substituted and unsubstituted imidazoles, such as imidazole, 2-methylimidazole, and 2-phenylimidazole. Examples of imidazole/epoxy adducts can be commercially available under the trade designation EPON P-101 from Shell Chemical and under the trade designation XU HT 261 from Ciba-Geigy Corporation. Examples of tetraalkylammonium salts may include tetramethylammonium bromides, tetramethylammonium iodides, tetramethylammonium chlorides, myrystyltrimethylammonium bromides, myrystyltrimethylammonium iodides, myrystyltrimethylammonium chlorides, and the like. Examples of phosphonium salts may include ethyltriphenylphosphonium bromides, ethyltriphenylphosphonium iodides and ethyltriphenylphosphonium chlorides, and the like. Examples of tertiary amines may include N,N-dimethylcyclohexylamine, N,N-dimethylaniline, N-methylmorpholine, N,N'-dimethylpiperazine, 2,2,6,6,-tetramethyl-4-dimethylaminopiperidine, N,N-dimethyloctadecylamine, N,N-dimethylhexadecylamine, 1,8-diazabicyclo[5.4.0] undec-7-ene, N,N,N',N'-tetramethylhexamethylenediamine, N,N,N',N',N"-pentamethyldiethylenetriamine, triethylenediamine and benzyldimethylamine. Examples of imidazolines include substituted and unsubstituted imidazolines, such as 2-phenylimidazoline. Imidazoline salts of mono- or di-carboxylic acids are derived from imidazoline-based compound and mono- or di-carboxylic acids. Suitable monocarboxylic acids and dicarboxylic acids have one or two carboxylic acid groups (—COOH) per molecule respectively. They include aromatic and aliphatic (saturated and unsaturated) acids and combinations thereof (i.e., araliphatic). Typical monocarboxylic acids or dicarboxylic acids include, but are not limited to, terephthalic acid, isophthalic acid, phthalic acid, benzoic acid, azelaic acid, adipic acid, succinic acid, glutaric acid, pimelic acid, suberic acid, sebacic acid, decanedicarboxylic acid, dodecandicarboxylic acid, acetic acid, 2-ethylhexanoic acid and maleic acid. Preferred mono- and di-carboxylic acids are adipic acid, sebacic acid and dodecanedioic acid.

Imidazoline-based compound such as a 2-imidazoline compound may be represented by the following general structure:

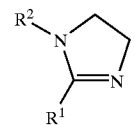

wherein $R^1$ is hydrogen, an aromatic group, an aliphatic group (saturated or unsaturated), cycloaliphatic or an araliphatic group, preferably having about 1-12 carbon atoms. Examples of $R^1$ include phenyl, 2-chlorophenyl, 2-hydroxyphenyl, 4-chlorophenyl, 4-methyl phenyl, and the like, alkyl, such as methyl, undecyl and the like, aralkyl, such as benzyl and the like, or hydrogen. $R^2$ is hydrogen or an alkyl group, preferably having about 1 to 12 carbon atoms, such as methyl and the like.

Typically, 2-imidazolines include 2-phenyl-2-imidazoline, 2-(2-hydroxyphenyl)-2-imidazoline, 2-(2-chlorophenyl)-2-imidazoline, 2-(4-chlorophenyl)-2-imidazoline, 2-(4-methylphenyl)-2-imidazoline, 2-n-undecyl-2-imidazoline, 2-benzyl-2-imidazoline, 4,4-dimethyl-2-imidazoline, and 2-methyl-2-imidazoline. The Imidazoline salts of mono- or di-carboxylic acids and their preparations are described, for example, in GB 2,312,897, which is incorporated herein by reference.

The powder coating composition of the invention can be formulated to include the catalyst in an amount sufficient to cure the composition at a temperature of about 300° F. or below for about 30 minutes or less. Preferably, the catalyst is in an amount of from about 0.1 to about 10.0 pphr (parts per hundred resin), more preferably, from about 0.5 to about 5 pphr, and most preferably, from about 1.0 to about 4.0 pphr.

In another aspect of the invention, the powder coating compositions may comprise a first catalyst to function primarily as an epoxy homopolymerization catalyst and a second catalyst to function primarily as an epoxy/carboxylic acid reaction catalyst. Examples of useful first catalyst may include imidazoles, imidazole/epoxy adducts, tertiary amines, and mixtures thereof. Examples of useful second may include imidazolines, imidazoline salts of mono- or di-carboxylic acids, tertiary amines, tetraalkylammonium salts, phosphonium salts, and mixtures thereof.

Although not bounded by any theory, it is believed that an imidazole adducts to epoxy resin by opening an epoxy ring. The adducted imidazole acts as a catalyst that facilitates further epoxy ring opening, thereby promoting the homopolymerization of the epoxide groups. On the other hand, an imidazoline based catalyst may promote addition reactions between the epoxide groups and the carboxylic acid groups, thereby further reducing the cure temperature.

The powder coating compositions of the invention can be formulated such that, by adjusting the amounts and ratios of the catalysts, the coatings can be cured at a low temperature such as at about 300° F. or below, preferably at about 280° F. or below to achieve the desired gloss and high performance, e.g., high hardness.

Optionally, the powder coating compositions of the invention may contain other additives that are common to powder coatings. These additives include, without limitation, fillers, slip additives, pigments, dyes, UV stabilizers, antioxidants, fluidizing agents, flow control agents, degassing agents, flexibilizing agents and texturing agents, etc. For example, flow control agents such as an acrylic compound, e.g., Modaflow 2000 or Resiflow P-67, or a silicon compound are known in the coating or powder coating art and are generally incorporated into the powder coating compositions to improve the surface tension, thereby facilitating the flow of the polymers as they are melted to provide a smoother finish of the final solid coatings. Flexibilizing agents such as solid plasticizers, rubber, hydroxyl or acid functional polyester, styrene maleic anhydride and polyanhydride resins are used to provide a finish with more flexibility. Examples of useful plasticizers may include sucrose benzoate, pentaerythritol tetrabenzoate and cyclohexanedimethanol dibenzoate. Examples of useful rubber may include natural and most synthetic rubbers, such as styrene-butadiene and acrylonitrile-butadiene polymers. Examples of useful polyesters may include those formed by the condensation reaction of aliphatic polyols, including cycloaliphatic polyols, with aliphatic and/or aromatic polycarboxylic acids and anhydrides. Examples of suitable aliphatic polyols may include 1,2-ethanediol, 1,3-propanediol, 1,4-butanediol, 1,6-hexanediol, neopentyl glycol, cyclohexane dimethanol, trimethlyopropene, and the like. Examples of suitable polycarboxylic acids and anhydrides may include succinic acid, adipic acid, azelaic acid, sebacic acid, terephthalic acid, isophthalic acid, tetrahydrophthalic acid, hexahydrophthalic acid trimellitic acid, and anhydrides of such acids. The flexibilizer, if needed, may be present up to 50%, preferably, from about 5% to about 30% by weight in the composition. Pigments may be added to give the powder coatings color. Examples of pigments include, but are not limited to, titanium dioxide, carbon black, and organic and inorganic pigments of any available color depending on the application. The amounts of these additional additives depend upon the particular properties of the final coating desired.

The powder coating compositions of the invention may be prepared by conventional techniques employed in the powder coating art. Typically, the components of the powder coating composition are combined and thoroughly blended together and then, melt blended and extruded in a single screw or twin screw extruder. The extrudate is immediately cooled and then is grounded in a mill, such as a Brinkman mill, a Bantam hammer mill, an Alpine Mill or an ACM Mill, and sieved to obtain a powder of appropriate particle size depending on the application. Although a wide range of the particle sizes is useful for the purpose of the invention, typically, the average particle size is about 5 to about 250 micron. Preferably, the average particle size of the powder coating composition of the invention is from about 10 microns to about 80 microns, and more preferably, from about 20 to 40 microns.

The powder coating compositions of the invention are then applied onto at least one of the surfaces of a substrate using any conventional powder coating deposition technique, such as electrostatic spray, to obtain smooth and uniform coatings. Curing is achieved by heating the coated substrate at a temperature for a time sufficient to cure the composition. By addition of the catalyst(s), the cure temperature of the powder coating compositions of the invention can be adjusted to a low temperature. The low cure temperature limits the substrate heat exposure to diminish the outgassing from the wood substrates that could degrade or damage the substrate integrity as well as the continuous uniformity of the final finish. Preferably, the cure temperature of the powder coating compositions of the invention is at about 300° F. or below, more preferably, at about 280° F. or below. The cure time varies depending on the cure temperature, the nature and the thickness of the substrate. Preferably, the cure time may be shorter than 30 minutes, more preferably, the cure time may be from about shorter than 20 minutes.

The thickness of the cured coatings of the invention varies depending on the application and performance requirements, but preferably, ranging from about 1.5 mil to about 8.0 mil.

The powder coating compositions of the invention may be applied to various conventional substrates such as metals, e.g., steel, or aluminum; glass; ceramic; carbon-fiber; and graphite. Particularly, the powder coating compositions of the invention can be readily applied to heat sensitive substrates such as plastic or fiber-reinforced plastic substrates, and especially wood substrates.

Typically, the lower the cure temperature and/or the shorter the cure time are, the more difficult it is to achieve high performance. Likewise, the lower the cure temperature and/or the shorter the cure time are, the more difficult it is to control gloss, especially to achieve aesthetically desired low gloss. Further, the lower the cure temperature and/or the shorter the cure time are, the more difficult it is to process the powder coatings as traditional process temperatures are in the same range as the targeted cure temperatures. Higher performance coatings as defined by toughness and durability tests like hardness, scratch, mar, chemical resistance and impact can be challenging with traditional coating powders cured at high temperatures. Again the challenge becomes greater as the cure temperature is lowered or the cure time is shortened.

Surprisingly, the powder coating compositions of the invention can be formulated to provide the surface of the articles with the desired high performance and other characteristics while cured at a low temperature. For instance, the powder coating compositions of the invention can be formulated to provide finishes with a wide range of 60° gloss, either high or low, depending on the application, such as by selecting the resins based on the compatibility of the composition or by using the combination of the catalysts. For aesthetically desired low gloss, the powder coating compositions of the invention can be formulated, such as by selecting the resins with low compatibility to provide coatings with controllable 60° gloss of from about 5 to 60, preferably, from about 10 to 40.

Further, the powder coating compositions of the invention can be formulated to provide finishes with varied hardness, depending on the application, such as by changing the degree of cross-linking density, or the degree of cure, or by selecting resins having different Tgs. For example, when high hardness such as that measured by pencil hardness is desired, the powder coating compositions of the invention can be formulated using resin(s) with an increased Tg, or formulated to increase the crosslinking density or the degree of cure. Alternatively, increasing the cure time and/or temperature can increase the degree of cure. Typically, coatings of the present invention can be formulated to provide coatings with pencil hardness of from 2H to 9H, and preferably, from 3H to 9H, depending on the application.

In addition, the powder coating compositions of the invention can be formulated to provide coatings on substrates especially engineered wood substrates with aesthetically acceptable smooth appearance as well as orange peel or textured appearance depending on the application.

In another aspect, the invention provides an article comprising a heat sensitive substrate coated on at least one of the surfaces of the substrate with any of the aforesaid new powder coating compositions and cured at a low temperature to produce a decorative and/or protective finish with controllable gloss, especially aesthetically desired low gloss and/or very high hardness.

Particularly, the article of the invention comprises a heat sensitive substrate, especially wood substrate, coated on at least one of the surfaces of the substrate with any of the aforesaid new powder coating compositions and cured at a temperature of about 300° F. or below to produce a decorative and/or protective finish with 60° gloss of from about 2 to 95, preferably, from about 5 to 60, and more preferably, from about 10 to 40, and pencil hardness of from about F to 9H, preferably, from about H to 9H and more preferably, from about 3H to 9H.

The invention is further illustrated by the following non-limiting examples. It should be understood, however, that many variations and modifications may be made while remaining within the scope of the present invention. All components are measured as parts. All the parts and percentages specified herein are by weight unless otherwise stated.

DETAILED DESCRIPTION OF THE EMBODIMENTS OF THE INVENTION

Testing Method

Gloss

The gloss of the cured powder coating of the invention is measured according to the Standard Test Method for Specular Gloss of ASTM D523.

Pencil Hardness

The pencil hardness of the cured powder coating of the invention is measured according to the Standard Test Method for Film Hardness by Pencil Test of ASTM D3363.

MEK Resistance

The MEK resistance of the cured powder coating of the invention is measured according to the Standard Test Method for Measuring MEK Resistance by Solvent Rub of ASTM (Test Method) D4752-98.

EXAMPLES

Example 1

A powder coating composition was prepared by premixing 5.0 parts SCX 843 (acid functional acrylic resin, S.C. Johnson, WI), 48.5 parts YD012 (polyepoxy resin, KUKDO Chemical Ind. Co., Ltd. Seoul, Korea), 3.7 parts by weight PT810 (TGIC, Ciba Geigy Co.), 47.8 parts GMA 300 (epoxy functional acrylic resin, Estron Chemical Company, CT), 2.5 parts 2-phenyl-2-imidazoline/dodecandioic acid disalt, 1.2 parts 2-phenyl-imidazole, and 1.5 parts Resiflow P-67 (acrylic resin, flow additive). The mixture was then melt blended in a twin-screw extruder at 500 rpm, extruded, cooled, grounded and then sieved through 100 mesh sieve to obtain coating powders.

Using an electrostatic spray coating method, the above-prepared coating powders were then applied onto a medium density fiberboard and cured in an oven at about 270° F. for about 5 minutes. The 60° gloss, pencil hardness and MEK resistance of the cured powder coating were tested and the test results are shown in Table I.

Example 2

A powder coating composition was prepared according to Example 1, except that 10.0 parts SCX 843 was used. The 60° gloss, pencil hardness and MEK resistance of the cured powder coating were tested and the test results are shown in Table I.

Example 3

A powder coating composition was prepared according to Example 1, except that 15.0 parts SCX 843 was used. The 60° ° gloss, pencil hardness and MEK resistance of the cured powder coating were tested and the test results are shown in Table I.

Example 4

A powder coating composition was prepared according to Example 1, except that 20.0 parts SCX 843 was used. The 60° gloss, pencil hardness and MEK resistance of the cured powder coating were tested and the test results are shown in Table I.

Example 5

A powder coating composition was prepared according to Example 1, except that 25.0 parts SCX 843 was used. The 60° gloss, pencil hardness and MEK resistance of the cured powder coating were tested and the test results are shown in Table I.

TABLE I

| Ex. No. | Gloss at 60° | Pencil Hardness | MEK Resistance |
|---|---|---|---|
| 1 | 78 | 5H | Pass |
| 2 | 67 | 5H | Pass |
| 3 | 34 | 5H | Pass |
| 4 | 20 | 5H | Pass |
| 5 | 12.7 | 6H | Pass |

Examples 6–10

Powder coating compositions were prepared according to Example 1, except that 5.0 parts, 10.0 parts, 15.0 parts and 25.0 parts SCX 848 was used, respectively, in each example. The 60° gloss, pencil hardness and MEK resistance of the cured powder coating were tested and the test results are shown in Table II.

TABLE II

| Ex. No. | Gloss at 60° | Pencil Hardness | MEK Resistance |
|---|---|---|---|
| 6 | 65 | 5H | Pass |
| 7 | 33 | 5H | Pass |
| 8 | 25 | 5H | Pass |

TABLE II-continued

| Ex. No. | Gloss at 60° | Pencil Hardness | MEK Resistance |
|---|---|---|---|
| 9 | 11.4 | 5H | Pass |
| 10 | 10.6 | 5H | Pass |

Example 11

A powder coating composition was prepared by pre-mixing 14.4 parts SCX 848, 85.6 parts YD012, 1.0 parts 2-methyl-imidazole, 1.5 parts Resiflow P-67 and 25 parts RCL-2 (white pigment). The mixture was then melt blended in a twin-screw extruder at 500 rpm, extruded, cooled, grounded and then sieved through 100 mesh sieve to obtain coating powders.

Using an electrostatic spray coating method, the above-prepared coating powders were then applied onto a medium density fiberboard and cured in an oven at about 280° F. for about 15 minutes. The 60° gloss, pencil hardness and MEK resistance of the cured powder coating were tested and the test results are shown in Table III.

Example 12

A powder coating composition was prepared according to Example 11, except that 15.6 parts SCX 848, 31.8 parts SCX 822, 52.6 parts GT7220 (Novolak epoxy resin, Ciba Giegy), 1.25 parts 2-phenyl-imidazoline, 1.5 parts Modaflow 2000 and 30 parts RCL-2 were pre-mixed. The coated medium density fiberboard was cured in an oven at about 270° F. for about 5 minutes. The 60° gloss and MEK resistance of the cured powder coating were tested and the test results are shown in Table III.

Example 13

A powder coating composition was prepared according to Example 12, except that 28.0 parts SCX 843, 72.0 parts GT7220, 1.5 parts 2-phenylimidazoline, 1.5 parts Modaflow 2000 and 30 parts RCL-2 were pre-mixed. The 60° gloss and MEK resistance of the cured powder coating were tested and the test results are shown in Table III.

Example 14

A powder coating composition was prepared according to Example 12, except that 28.7 parts by weight SCX 848, 71.3 parts by weight YD012, 2.0 parts 2-phenyl-imidazole, 1.5 parts Modaflow 2000 and 1.0 parts BP120 (carbon black pigment) were pre-mixed. The 60° gloss and MEK resistance of the cured powder coating were tested and the test results are shown in Table III.

Example 15

A powder coating composition was prepared according to Example 12, except that 41.1 parts SCX 848, 51.0 parts YD012, 7.7 parts TGIC, 2.5 parts 2-phenyl-2-imidazoline/dodecandioic acid disalt, 1.5 parts Modaflow 2000, 1.0 parts Lanco 1780 (wax) and 1.0 parts Taber Tiger 5512 (abrasion resistant additive) were pre-mixed. The 60° gloss and MEK resistance of the cured powder coating were tested and the test results are shown in Table III.

TABLE III

| Ex. No. | Gloss at 60° | Pencil Hardness | MEK Resistance |
|---|---|---|---|
| 11 | 30 | 3H | Pass |
| 12 | 29 | — | Pass |
| 13 | 11 | — | Pass |
| 14 | 9 | — | Pass |
| 15 | 2 | — | Pass |

Example 16

A powder coating composition was prepared by pre-mixing 19.0 parts SCX 848, 39.3 parts YD012, 3.0 parts PT-810, 38.7 parts GMA 300, 0.5 parts 2-phenyl-2-imidazoline/dodecandioic acid disalt, 2.0 parts 2-phenyl-imidazole, 1.5 parts Resiflow P-67 and 30 parts RCL-2. The mixture was then melt blended in a twin-screw extruder at 500 rpm, extruded, cooled, grounded and then sieved through 100 mesh sieve to obtain coating powders.

Using an electrostatic spray coating method, the above-prepared coating powders were then applied onto a medium density fiberboard and cured in an oven at about 280° F. for about 15 minutes. The 60° gloss, pencil hardness and MEK resistance of the cured powder coating were tested and the test results are shown in Table IV.

Example 17

A powder coating composition was prepared according to Example 16, except that 1.0 parts 2-phenyl-2-imidazoline/dodecandioic acid disalt was used. The 60° gloss, pencil hardness and MEK resistance of the cured powder coating were tested and the test results are shown in Table IV.

Example 18

A powder coating composition was prepared according to Example 16, except that 2.0 parts 2-phenyl-2-imidazoline/dodecandioic acid disalt was used. The 60° gloss, pencil hardness and MEK resistance of the cured powder coating were tested and the test results are shown in Table IV.

Example 19

A powder coating composition was prepared according to Example 18, except that 1.0 parts 2-phenyl-imidazole was used. The 60° gloss, pencil hardness and MEK resistance of the cured powder coating were tested and the test results are shown in Table IV.

Example 20

A powder coating composition was prepared according to Example 19, except that no PT-810 was used. The 60° gloss, pencil hardness and MEK resistance of the cured powder coating were tested and the test results are shown in Table IV.

Example 21

A powder coating composition was prepared according to Example 19, except that 1.0 parts PT-810 was used. The 60° gloss, pencil hardness and MEK resistance of the cured powder coating were tested and the test results are shown in Table IV.

TABLE IV

| Ex. No. | Gloss at 60° | Pencil Hardness | MEK Resistance |
|---|---|---|---|
| 16 | 52 | 3H | Pass |
| 17 | 41 | 3H | Pass |
| 18 | 25 | 3H | Pass |
| 19 | 15 | 4–5H | Pass |
| 20 | 10 | 7H | Pass |
| 21 | 6.5 | 9H | Pass |

Example 22

A powder coating composition was prepared by premixing 28.7 parts SCX 848, 71.3 parts YD012, 2.0 parts 2-phenyl-imidazole, 1.0 parts Lanco 1780, 1.0 parts Taber Tiger 5512 (wax), 1.0 parts Ultranox 626 (antioxidant) and 30 parts RCL-2. The mixture was then melt blended in a twin-screw extruder at 500 rpm, extruded, cooled, grounded and then sieved through 100 mesh sieve to obtain coating powders.

Using an electrostatic spray coating method, the above-prepared coating powders were then applied onto a medium density fiberboard and cured in an oven at about 270° F. for about 5 minutes. The 60° gloss, pencil hardness and MEK resistance of the cured powder coating were tested and the test results are shown in Table V.

Example 23

A powder coating composition was prepared by premixing 83.8 parts SCX 835, 16.5 parts Epo-Thoto YDCN-500-90P (orth-cresol novolac epoxy resin), 2.2 parts 2-phenyl-imidazole, 1.5 parts Modarez MFP A-25-P (flow control additive, Synthron Inc., Morganton, WC), 0.29 parts Cab-O-Sil CT111 G (fumed silica, Cabot Corp, Tuscola, Ill.), and 30 parts RCL-2. The mixture was then melt blended in a twin-screw extruder at 500 rpm, extruded, cooled, grounded and then sieved through 100 mesh sieve to obtain coating powders.

Using an electrostatic spray coating method, the above-prepared coating powders were then applied onto a medium density fiberboard and cured in an oven at about 270° F. for about 5 minutes. The 60° gloss, pencil hardness and MEK resistance of the cured powder coating were tested and the test results are shown in Table V.

TABLE V

| Ex. No. | Gloss at 60° | Pencil Hardness | MEK Resistance |
|---|---|---|---|
| 22 | 15 | 4H | Pass |
| 23 | 70 | F | Pass |

We claim:

1. A powder coating composition comprising:
   a). about 10% to 90% by weight, relative to (a) plus (b), of carboxylic acid functional acrylic resin(s);
   b). about 71% to 90% by weight, relative to (a) plus (b), of polyepoxy resin(s); and
   c). a catalyst in an amount sufficient to cure the composition at a temperature of about 300° F. or below for about 30 minutes or less, wherein the composition provides a finish having a pencil hardness of at least 3H.
2. The powder coating composition of claim 1, wherein the catalyst is selected from the group consisting of imidazoles, imidazole/epoxy adducts, tertiary amines, imidazolines, imidazoline salts of mono- or di-carboxylic acids, tetraalkylammonium salts, phosphonium salts, and mixtures thereof.
3. The powder coating composition of claim 1, wherein the composition provides a coating having 60° gloss of from about 2 to 95.
4. The powder coating composition of claim 3, wherein the composition provides a coating with 60° gloss of from about 5 to 60.
5. The powder coating composition of claim 4, wherein the composition provides a coating with 60° gloss of from about 10 to 40.
6. The powder coating composition of claim 1, wherein the composition provides a coating having pencil hardness of higher than 4H.
7. A powder coating composition of claim 1 further comprising a flexibilizing agent.
8. The powder coating composition of claim 7, wherein the flexibilizing agent is selected from a group consisting of solid plasticizers, polyester, rubber, styrene maleic anhydride and polyanhydride resins.
9. The powder coating composition of claim 7, wherein the catalyst is selected from the group consisting of imidazoles, imidazole/epoxy adducts, tertiary amines, imidazolines, imidazoline salts of mono- or di-carboxylic acids, tetraalkylammonium salts, phosphonium salts and mixture thereof.
10. The powder coating composition of claim 7, wherein the composition provides a coating having 60° gloss of from about 2 to 95.
11. The powder coating composition of claim 10, wherein the composition provides a coating with 60° gloss of from about 5 to 60.
12. The powder coating composition of claim 11, wherein the composition provides a coating with 60° gloss of from about 10 to 40.
13. The powder coating composition of claim 12, wherein the composition provides a coating having pencil hardness of from about F to 9H.
14. An article comprising a heat sensitive substrate, and coated and cured on at least one surface of the substrate with a powder coating composition of claim 1.
15. The article of claim 14, wherein the heat sensitive substrate is a wood substrate or a plastic substrate.
16. An article comprising a heat sensitive substrate, and coated and cured on at least one surface of the substrate with a powder coating composition of claim 7.
17. The article of claim 16, wherein the heat sensitive substrate is a wood substrate or a plastic substrate.
18. The powder coating composition of claim 1, wherein the polyepoxy resin is selected from the group consisting of glycidyl ethers of aromatic and aliphatic polyols, cycloaliphatic polyepoxides, epoxy-functional acrylic resins, heterocyclic polyepoxides, glycidyl esters of aromatic and aliphatic polycarboxylic acids, glycidyl polyamines and ether amines, and mixtures thereof.
19. The powder coating composition of claim 18, wherein the polyepoxy resin is selected from the group consisting of glycidyl ethers of aromatic polyols, epoxy-functional acrylic resins, heterocyclic polyepoxides, glycidyl esters of aromatic and aliphatic polycarboxylic acids, and mixtures thereof.
20. The powder coating composition of claim 19, wherein the polyepoxy resin is selected from the group consisting of glycidyl ethers of aromatic polyols, epoxy-functional acrylic resins, heterocyclic polyepoxides, and mixtures thereof.
21. The powder coating composition of claim 19, wherein the polyepoxy resin is selected from the group consisting of glycidyl ethers of aromatic polyols, epoxy-functional acrylic resins, glycidyl esters of aromatic and aliphatic polycarboxylic acids, and mixtures thereof.

22. The powder coating composition of claim 20, wherein the heterocyclic polyepoxide is triglycidylisocyanurate.

23. The powder coating composition of claim 20, wherein the polyepoxy resin is an epoxy functional acrylic resin that is based on glycidyl methacrylate.

24. The powder coating composition of claim 21, wherein the glycidyl ester of aromatic and aliphatic polycarboxylic acid is a glycidyl ester of di- or tri-carboxylic acids.

25. The powder coating composition of claim 2, wherein the first catalyst is selected from the group consisting of imidazoles, imidazole/epoxy adducts, imidazoline salts of mono- or di-carboxylic acids, and mixtures thereof.

26. The powder coating composition of claim 24, wherein the catalyst is selected from 2-phenyl-imidazole, 2-methyl-imidazole, a salt of 2-phenyl-2-imidazoline and dodecanedioic acid, and mixture thereof.

* * * * *

UNITED STATES PATENT AND TRADEMARK OFFICE
CERTIFICATE OF CORRECTION

PATENT NO. : 6,797,385 B2
DATED : September 28, 2004
INVENTOR(S) : Stephen C. Hart et al.

It is certified that error appears in the above-identified patent and that said Letters Patent is hereby corrected as shown below:

Column 13,
Line 59, "to 90 %" should read -- to about 29 % --.
Line 61, "to 90 %" should read -- to about 90 % --.

Column 14,
Line 17, "A" should read -- The --.

Column 15,
Line 6, "resin that is based" should read -- resin based --.

Column 16,
Line 2, "the first catalyst" should read -- the catalyst --.

Signed and Sealed this

First Day of February, 2005

JON W. DUDAS
*Director of the United States Patent and Trademark Office*